United States Patent [19]
Echols et al.

[11] Patent Number: 5,480,193
[45] Date of Patent: Jan. 2, 1996

[54] CLAMP FOR PUSH-ON COUPLINGS

[76] Inventors: Joseph A. Echols, 3070 Business Park Dr., Ste. G, Norcross, Ga. 30071; Jean D. Kimbrel, 210 Church St., Cerulian, Ky. 42215; Sandra L. Montz, 2556 Barrett Ave., Naples, Fla. 33962

[21] Appl. No.: 445,914

[22] Filed: May 22, 1995

[51] Int. Cl.$^6$ ............................................. F16L 11/14
[52] U.S. Cl. ................. 285/45; 285/318; 285/330; 285/351; 285/373; 285/423
[58] Field of Search ................... 285/318, 49, 373, 285/423, 243, 45, 351, 330, 177

[56] References Cited

U.S. PATENT DOCUMENTS

| Re. 33,946 | 6/1992 | Corzine . | |
|---|---|---|---|
| 4,162,092 | 7/1979 | Hayes | 285/423 X |
| 4,653,782 | 3/1987 | Munday | 285/373 |
| 4,671,541 | 6/1987 | Webb et al. | 285/373 X |
| 4,750,762 | 6/1988 | Corzine . | |
| 5,002,314 | 3/1991 | Smith | 285/318 X |

Primary Examiner—Dave W. Arola
Attorney, Agent, or Firm—Merrill N. Johnson

[57] ABSTRACT

An improved axially split clamp for preventing rupture of the O-ring seal of Ford Spring-Lok fittings even when the outside diameter of the Spring-Lok fitting is oversized. Each mirror-image half of the axially split clamp includes a semi-annular surface sized to fit snugly over the cage of the Spring-Lok pipe and also a semi-circular surface positioned to encircle that portion of the Spring-Lok push-on fitting over the coupling's O-ring seal. A flat-sided groove is cut in each semi-circular surface and a ribbon-like strip of rubber or other resilient material is inserted into the groove. The strip's thickness is about twice the depth of the groove so that when the two halves of the clamp are screwed together, the resilient material will firmly grip the outer diameter of the push-on fitting and thereby prevent back and forth transverse movement of the Spring-Lok fitting, prevent wear and failure of the O-ring seal and prevent the escape of fluid from the Spring-Lok coupling.

4 Claims, 1 Drawing Sheet

CLAMP FOR PUSH-ON COUPLINGS

FIELD OF INVENTION

The invention lies in the field of fluid line couplings which use push-on fittings of the type shown in Ford Motor Company's U.S. Pat. No. 4,055,359.

BACKGROUND OF THE INVENTION

About fifteen years ago when Ford Motor Company began using its patented push-on couplings marketed as Ford Spring-Lock® fittings in assembling its vehicle air conditioning systems, it created an acute vehicle service industry problem due to the high incidence of failure of the O-rings used to seal the connection between the push-on fitting and the caged pipe to which the push-on fitting is coupled.

Two solutions to the foregoing problem were patented by George Corzine, namely, U.S. Pat. No. 4,728,130 and U.S. Pat. No. Re. 33,946. Hundreds of thousands of axially split clamps made according to U.S. Pat. No. Re. 33,946 have been sold and used successfully on Ford Spring-Lock couplings to prevent the failure of the coupling's two O-rings.

However, the outside diameter of the push-on fittings of Ford's Spring-Lock couplings is not rigidly controlled and this fact has in some instances caused undesirable deformation of oversized Ford push-on fittings when the fitting is clamped by an axially split clamp made according to U.S. Pat. No. Re. 33,946.

Ford's Spring-Lock couplings are made in six sizes to couple together the various sizes of tubing used in the air conditioning systems of its Ford, Mercury, Lincoln and other vehicles. Each Spring-Lock coupling includes a caged pipe whose cage includes a garter-type coiled spring, a cylindrical push-on fitting whose end is flared to fit and lock within the cage of the pipe, and a pair of O-rings designed to seal the connection between the pipe and the push-on fitting.

Axially split clamps made according to U.S. Pat. No. Re. 33,946 are made both of metal and of molded plastic and all of them include semi-circular or arcuate surfaces which, when the clamp is screwed together, apply a strong, inwardly directed substantially 360° pressure to the outer surface of the push-on fitting which locks the pipe and push-on fitting in strict axial alignment and prevents rupture of the O-ring seal between the fitting and the pipe. However, if the outer diameter of the push-on fitting is oversized, when the axially split clamp is screwed together, the inwardly directed pressure of the clamp may be sufficient to deform the normally cylindrical form of the thin walled push-on fitting.

SUMMARY OF THE INVENTION

Our invention provides an improved clamp for push-on couplings which will not deform oversized push-on fittings and yet will positively lock the push-on fitting and the pipe of the coupling together and prevent rupture of the coupling's O-ring seal.

Axially split clamps according to U.S. Pat. No. Re. 33,946 are made in six sizes in order to fit the six sizes of Ford's Spring-Lock couplings. Although the curvature or arc of the semi-circular surfaces of the two mirror-image halves of the six sizes of the clamp all vary in order to snugly encircle the outer cylindrical surface of the six different sized push-on fittings, all of the semi-circular surfaces measure about one half an inch in width.

Briefly put, our invention replaces the unyielding metal or plastic semi-circular surfaces of the clamp according to U.S. Pat. No. Re. 33,946 with resilient surfaces which will not deform oversized push-on fittings but which will still lock the push-on fitting and the pipe of the coupling together and prevent rupture of the O-ring seal.

This result is preferably achieved by slightly increasing the arc of the two semi-circular surfaces of the clamp and then making a flat sided groove having a width of about 0.35 inches and a uniform depth of about one thirty-secondth of an inch down the center of both halves of the clamp. A flat ribbon-like grommet of rubber or similar resilient material is inserted into the flat sided groove of both halves of the clamp with the upper half of each grommet lying outside its groove and extending somewhat above the solid semi-circular surfaces of the clamp.

When the two halves of our improved clamp are screwed together around a Spring-Lock coupling, the flat upper surfaces of the two grommets will come into encircling contact with the outer cylindrical surface of the push-on fitting, thereby applying the same 360° inwardly directed pressure as done by the semi-circular metal or plastic surfaces of the original clamp. However, even in the case of oversized push-on fittings, the resilient grommets are incapable of deforming the cylindrical wall of the push-on fitting.

BRIEF DESCRIPTION OF THE DRAWINGS

The appended drawings illustrate a preferred form of our invention and are intended to supplement the description of our improved axially split clamp in the text of this application.

DETAILED DESCRIPTION OF THE PREFERRED EMBODIMENT

Figure 3:
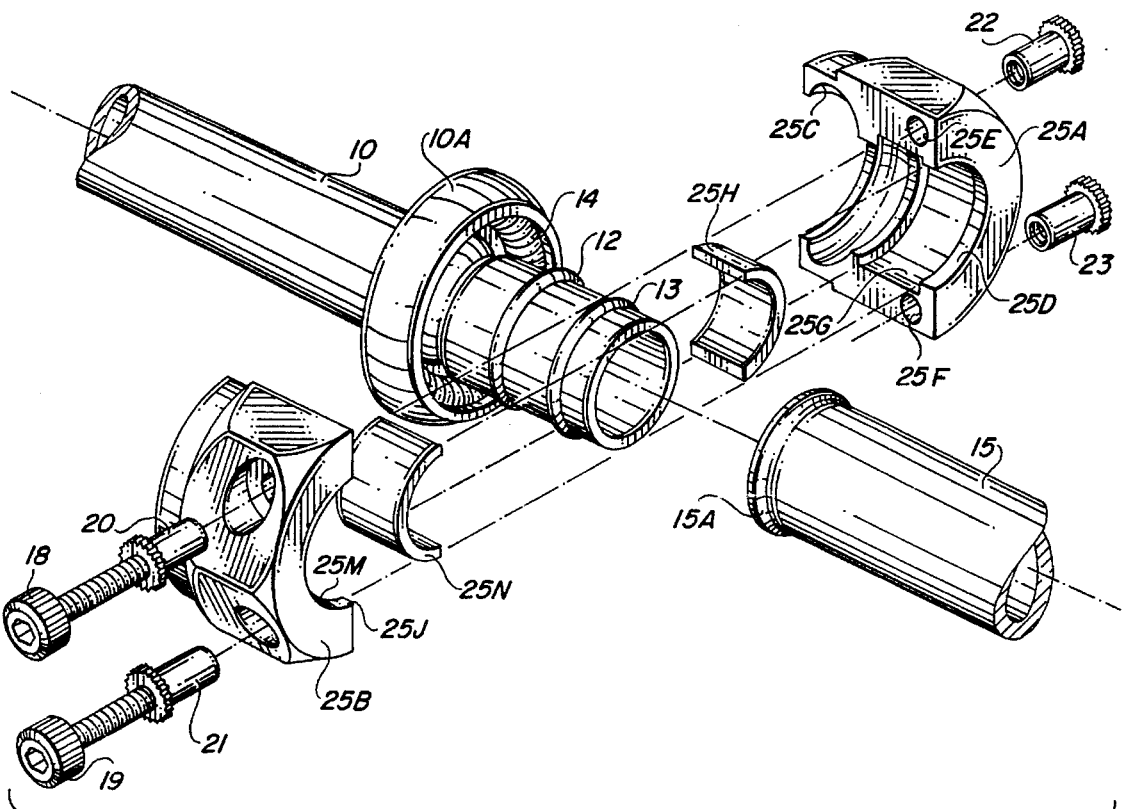
FIG. 3 is an exploded view showing the components of our improved clamp in relation to the two parts of an uncoupled Spring-Lock coupling.

Referring first to FIG. 3 of the drawings, the caged pipe 10 of a Ford Spring-Lock coupling is shown with its cage 10A containing a coiled garter-type spring 14 and a pair of resilient O-rings 12 and 13 mounted on the front end of pipe 10 forward of its cage 10A. FIG. 3 also shows the front end of the push-on fitting 15 axially aligned with pipe 10. The fitting's outwardly flared end 15A is designed to be pushed over O-rings 12 and 13 and into cage 10A where its flared end 15A fits under spring 14 and is thus locked in place to couple fitting 15 and pipe 10 together. The fluid which flows through the coupling is supposedly sealed from escape by O-rings 12 and 13.

FIG. 3 also shows the two halves 25A and 25B of clamp 25 which are preferably molded of a high strength plastic such as styrene. Each clamp half is a mirror-image of the other half and each includes similar semi-annular recesses 25C shaped and sized to fit snugly over cage 10A of pipe 10. Each clamp half also includes a flat sided semi-circular groove such as 25G in the center of a semi-circular cylindrical surface 25D. Preferably groove 25G is about one thirty-secondth of an inch deep. A ribbon-like strip 25H made of rubber or other resilient material is inserted into the flat-sided groove 25G and affixed to the groove. The thickness of strip 25H is somewhat greater than the depth of groove 25G.

Figure 1:
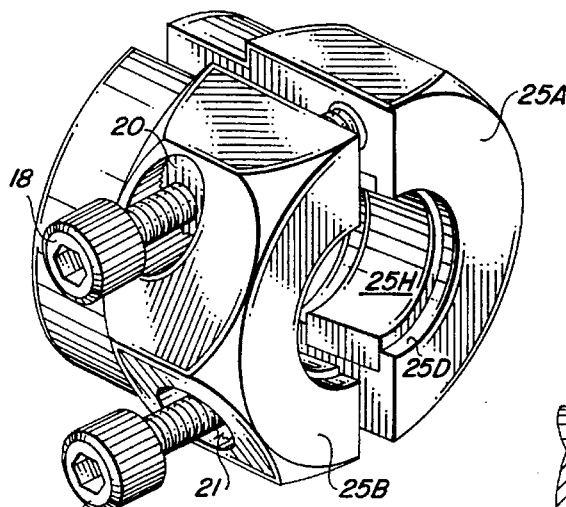
FIG. 1 is a perspective view showing a preferred form of our improved axially split clamp.

As best shown in FIG. 1, clamp halves 25A and 25B are joined together by a pair of screws 18 and 19. Screw 18 fits into two threaded metal inserts 20 and 22 which are inserted into aligned holes such as hole 25E in clamp half 25A as shown in FIG. 3. Likewise, screw 19 fits into two threaded metal inserts 21 and 23 which are inserted into a pair of aligned holes such as hole 25F in clamp half 25A. The outer edges of the enlarged washer-like end of each insert 20, 21, 22 and 23 is scalloped so that the insert will not rotate as screws 18 and 19 are screwed into the inserts to bring clamp halves 25A and 25B together around an assembled Spring-Lock coupling.

Figure 2:
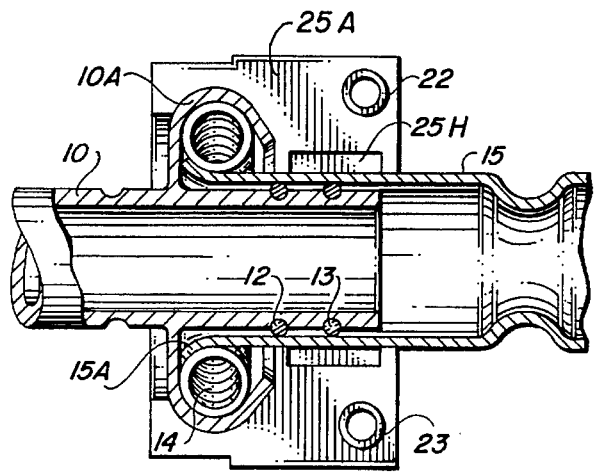
FIG. 2 is an elevational view largely in cross-section showing our axially split clamp clamped onto a Spring-Lock fitting.

FIG. 2 is largely in cross-section in order to show just how our improved clamp fits over a Ford Spring-Lock coupling to secure the connection between pipe 10 and fitting 15 and prevent any transverse movement between the pipe and the fitting. Repetitive transverse movement wears on O-ring seals 12 and 13 eventually causing them to fail, the escape of freon and failure of the vehicle's air conditioning system.

Screws 18 and 19 as shown in FIG. 3 with their respective inserts 20, 21, 22 and 23 bring clamp halves 25A and 25B together with semi-annular recesses 25C fitting snugly over cage 10A to lock pipe 10 and fitting 15 in their coupled position. To insure that inserts 20, 21, 22 and 23 will not rotate when screws 18 and 19 screwed into their respective inserts and thereby prevent proper mating of clamp halves 25A and 25B around a coupled Ford Spring-Lock device, the outer washer-like head of each insert has a scalloped or saw-toothed outer edge. At the same time the two ribbon-like strips 25H and 25N of resilient material encircling fitting 15 will apply a strong 360° inwardly directed pressure on the fitting directly over the coupling's O-ring seal which prevents back and forth movement transverse to the axis of the fitting, thereby preventing rupture of the O-ring seal between push-on fitting 15 and pipe 10.

While we have illustrated and described a preferred embodiment of our improved clamp for use with push-on fittings, various changes and modifications of the improved clamp will be apparent to those skilled in the art without departing from the spirit and scope of our invention. No limitation should be inferred from the foregoing descriptions. The scope of our invention is defined only by the appended claims.

We claim:

1. A clamping assembly for securing the sealing connection between a push-on fitting having a flared end fitted into a cage and surrounded by a garter-type coil spring housed within the cage of a pipe with a resilient O-ring sealing the connection between the push-on fitting and the pipe comprising a rigid clamp having a semi-annular recess aligned about the central axis of the clamp and sized to snugly fit over the cage of the pipe, the clamp also having an axially aligned rigid cylindrical surface with a diameter sized to encircle but not touch the outer surface of the push-on fitting adjacent the cage of the pipe, the clamp also having a pair of holes whose axes lie transverse to the axis of the clamp and lying on opposite sides of the clamp's cylindrical surface, the clamp being axially split into two mirror-image halves, each clamp half having in its semi-cylindrical surface a flat edged semi-cylindrical groove, the depth of the groove being about one thirty-second of an inch, a ribbon-like strip of resilient material inserted into the semi-cylindrical groove in each clamp half, the thickness of the strip being about one sixteenth of an inch to thereby accommodate oversize push-on fittings without deforming the oversize push-on fittings, and a pair of screws sized to fit into the holes in both clamp halves and designed to draw the two clamp halves together around a coupled pipe and push-on fitting, whereby a strong, inwardly directed substantially 360° pressure is applied to the outer surface of the push-on fitting by the two strips of resilient material without deforming the push-on fitting thereby locking the pipe and push-on fitting in strict axial alignment, preventing back and forth movement of the fitting and the pipe transverse to their common axis, and preventing the rupture of the O-ring seal between the fitting and the pipe.

2. A clamping assembly as set forth in claim 1 in which the two halves of the clamp are made from a high strength styrene plastic material.

3. A clamping assembly as set forth in claim 2 which includes a plurality of internally threaded metal inserts in each clamp half which are designed to receive the pair of screws.

4. A clamping assembly as set forth in claim 3 in which each metal insert includes at the end of the insert which lies flush with the outer surface of the plastic clamp half a washer-like disc whose outer edge is scalloped.

* * * * *

UNITED STATES PATENT AND TRADEMARK OFFICE
CERTIFICATE OF CORRECTION

PATENT NO. : 5,480,193

DATED : January 2, 1996

INVENTOR(S) : Joseph A. Echols, Jean D. Kimbrel and Sandra L. Montz

It is certified that error appears in the above-identified patent and that said Letters Patent is hereby corrected as shown below:

On title page, insert, item

[73] ASSIGNEE: Mister Nut, Inc., Naples, FL

Signed and Sealed this

Twenty-first Day of May, 1996

Attest:

BRUCE LEHMAN

Attesting Officer

Commissioner of Patents and Trademarks